United States Patent [19]

Teletzke et al.

[11] Patent Number: 5,046,560
[45] Date of Patent: Sep. 10, 1991

[54] OIL RECOVERY PROCESS USING ARKYL ARYL POLYALKOXYOL SULFONATE SURFACTANTS AS MOBILITY CONTROL AGENTS

[75] Inventors: Gary F. Teletzke, SugarLand; Ronald L. Reed, Houston, both of Tex.

[73] Assignee: Exxon Production Research Company, Houston, Tex.

[21] Appl. No.: 205,715

[22] Filed: Jun. 10, 1988

[51] Int. Cl.$^5$ .............. E21B 43/22; E21B 43/24
[52] U.S. Cl. .................... 166/272; 166/268; 166/273; 166/274; 166/303; 166/305.1; 252/8.554
[58] Field of Search ............ 166/268, 269, 272–275, 166/303, 305.1, 309; 252/8.554

[56] References Cited

U.S. PATENT DOCUMENTS

| | | | |
|---|---|---|---|
| 2,184,935 | 12/1939 | Bruson et al. | 260/512 |
| 3,084,743 | 4/1963 | West et al. | 166/273 |
| 3,204,694 | 9/1965 | Johnson, Jr. et al. | 166/274 X |
| 3,292,702 | 12/1966 | Boberg | 166/303 |
| 3,393,221 | 7/1988 | Boehmke et al. | 260/465 |
| 3,547,199 | 12/1970 | Froning et al. | 166/305.1 |
| 3,599,716 | 8/1971 | Thompson | 166/273 |
| 3,653,440 | 4/1972 | Reisberg | 166/273 |
| 3,882,940 | 5/1975 | Carlin | 166/273 |
| 3,893,511 | 7/1975 | Root | 166/305.1 |
| 3,908,762 | 9/1975 | Redford | 166/272 X |
| 3,977,471 | 8/1976 | Gale et al. | 166/273 |
| 3,981,361 | 9/1976 | Healy | 166/252 |
| 4,127,170 | 11/1978 | Redford | 166/272 X |
| 4,287,950 | 9/1981 | Baker et al. | 166/273 |
| 4,340,492 | 7/1982 | Stournas | 252/8.554 |
| 4,380,266 | 4/1983 | Wellington | 166/252 |
| 4,393,937 | 7/1983 | Dilgren | 166/272 |
| 4,502,538 | 3/1985 | Wellington | 166/252 |
| 4,507,211 | 3/1985 | Naylor et al. | 252/8.554 |
| 4,572,294 | 2/1986 | Duerksen et al. | 166/273 |
| 4,577,688 | 3/1986 | Gassmann et al. | 166/245 |
| 4,597,442 | 7/1986 | Dilgren et al. | 166/272 |
| 4,601,336 | 7/1986 | Dilgren et al. | 166/252 |
| 4,601,337 | 7/1986 | Lau et al. | 166/263 |
| 4,609,044 | 9/1986 | Lau | 166/270 |
| 4,637,466 | 1/1987 | Hawkins et al. | 166/272 |
| 4,682,653 | 7/1987 | Angstadt | 166/303 |
| 4,690,217 | 9/1987 | Taggart et al. | 166/274 |
| 4,699,214 | 10/1987 | Angstadt | 166/303 |
| 4,702,317 | 10/1987 | Shen | 166/272 |
| 4,703,797 | 11/1987 | Djabbarah | 166/252 |
| 4,739,831 | 4/1988 | Settlemeyer et al. | 166/273 |
| 4,773,484 | 9/1988 | Chang et al. | 166/273 |

FOREIGN PATENT DOCUMENTS 0279686 8/1988 European Pat. Off.
WO85/05146 11/1985 PCT Int'l Appl.

Primary Examiner—George A. Suchfield
Attorney, Agent, or Firm—Gary D. Lawson; Pamela L. Wilson

[57] ABSTRACT

A method for recovering oil from a subterranean formation is disclosed wherein an aqueous surfactant solution is injected into the formation to reduce the mobility of gas in a gas-flooding process. The gas may include hydrocarbon gas, inert gas, carbon dioxide, and steam, or mixtures thereof. The surfactant is represented by the general formula

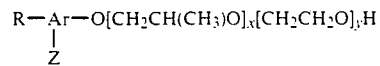

where
  R is a linear or branched chain alkyl group with n carbon atoms wherein n ranges from about 6 to about 50, except that if the gas is steam n ranges from about 9 to about 50;
  Ar is a mononuclear or fused ring dinuclear aryl group;
  Z is an ionic group consisting of $-SO_3^-M^+$ or $-R'-SO_3^-M^+$ wherein $M^+$ is a cation and $R'$ is a linear or branched chain alkyl group of from one to about six carbon atoms;
  x ranges from 0 to about 20; and
  y ranges from 3 to about 100.

20 Claims, 1 Drawing Sheet

OIL RECOVERY PROCESS USING ARKYL ARYL POLYALKOXYOL SULFONATE SURFACTANTS AS MOBILITY CONTROL AGENTS

FIELD OF THE INVENTION

This invention relates to recovering oil from a subterranean oil-bearing formation by injecting into the formation a gas and an aqueous surfactant solution to control gas mobility. More specifically, the invention pertains to use of alkyl aryl polyalkoxyol sulfonate surfactants to reduce gas mobility within an oil-bearing formation.

BACKGROUND OF THE INVENTION

A significant fraction of the oil-in-place is left in the ground after primary or secondary recovery. Gas injection, sometimes referred to as gas flooding, has been used to recover this remaining oil. The terms "gas injection" and "gas flooding" as used herein will mean an oil recovery process in which the fluid injected is a hydrocarbon gas, inert gas, carbon dioxide, or steam.

The success of gas floods has been diminished by the unfavorable mobility ratio between the gas and oil. The viscosities of gas mixtures are often 10 to 100 times lower than oil and water viscosities. At these unfavorable viscosity ratios, gases finger and channel through the formation, leaving parts of the reservoir unswept. Added to this fingering is the inherent tendency of a highly mobile gas to flow preferentially through the more permeable rock sections or to gravity override in the reservoir. These basic factors —permeability variations and unfavorable mobility and density ratios— greatly reduce the effectiveness of gas floods and may make them uneconomic. One apparent remedy is to control the mobility of the injected gas.

It has been suggested that the mobility of the gas may be reduced by injecting into a formation or forming in situ a mixture of a gas and an aqueous surfactant solution. Such mixtures are commonly referred to as foams. Since the effective viscosity of foam is greater than the viscosity of its components, it has been suggested that such mixtures of gas and aqueous surfactant solution will help improve the sweep efficiency of gas drives.

Foam is a dispersion of a large volume of gas in a relatively small volume of liquid. It should be noted, however, that at reservoir conditions several gases, including $CO_2$, exist as a dense fluid, resembling a liquid more than a gas. For this reason, the term "solvent" is sometimes used to describe the "gas" and the term "emulsion" is sometimes used to describe the solvent-water mixture.

Mobility control may be accomplished by injecting a bank of aqueous surfactant solution followed by injecting gas. Alternatively, banks of surfactant solution can be interspersed with the gas during injection to achieve a more continuous effect.

It is known that the choice of surfactant for use as a mobility control agent is of vital importance. Many surfactants reduce gas mobility too much, thus making the gas difficult to inject into the reservoir. Other surfactants don't reduce gas mobility enough, thus leading to inadequate improvement of sweep efficiency.

Conditions existing in a typical oil reservoir impose a severe challenge to surfactant performance. Most reservoirs have an aqueous phase of brine that may vary in concentration from 0.5% to 15% NaCl. Also, there may be divalent ions such as $Ca^{++}$ and $Mg^{++}$ present in significant concentrations (100 ppm or more). Adsorption or trapping of surfactant in viscous emulsions is another limitation. The effect of crude oil and temperature can also be deleterious if not properly taken into consideration.

Considerable effort has been made by the petroleum industry to identify surfactants with proper chemical stability, adsorption characteristics, and capability for gas-mobility reduction. Hundreds of surfactants have been screened. There continues to be a significant need, however, for improved gas mobility-control processes in which the amount of additional oil recovered as a result of injecting the surfactant and gas is sufficient to justify the cost of the process.

SUMMARY OF THE INVENTION

The present invention relates to an improved process for reducing gas mobility in a region of a subterranean, oil-containing formation by introducing into the formation a gas and an aqueous solution containing a surfactant selected from the group of compounds characterized by the general formula

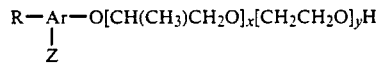

where
R is a linear or branched chain alkyl group with n carbon atoms wherein n ranges from about 6 to about 50, except that if the gas is steam n ranges from about 9 to about 50;
Ar is a mononuclear or fused ring dinuclear aryl group;
Z is an ionic group consisting of $-SO_3^-M^+$ M or $-R'SO_3^-M^+$ wherein $M^+$ is a cation and $R'$ is a linear or branched chain alkyl group of from one to about six carbon atoms;
x ranges from 0 to about 20; and
y ranges from 3 to about 100.

In a preferred embodiment for reducin8 the mobility of carbon dioxide, hydrocarbon gas, or inert gas, the aqueous solution contains 0.02 to 1.0% by weight $C_{12-30}$ phenol polyalkoxyol sulfonate containing 6-50 ethoxy groups. A preferred surfactant for a steam flood is $C_{16-30}$ phenol polyalkoxyol sulfonate containing 6-50 ethoxy groups.

The gas mobility is reduced in situ in the formation by injecting the aqueous surfactant solution into the formation through an injection well and injecting gas into the formation through the injection well with or after injection of the aqueous surfactant solution. In another embodiment the formation is first flooded with gas before injecting the mobility control agent. The steps of injecting aqueous surfactant solution and gas may be repeated.

The practice of this invention provides effective mobility control for gas floods and improves oil displacement efficiency.

DETAILED DESCRIPTION OF THE INVENTION

Figure 1:
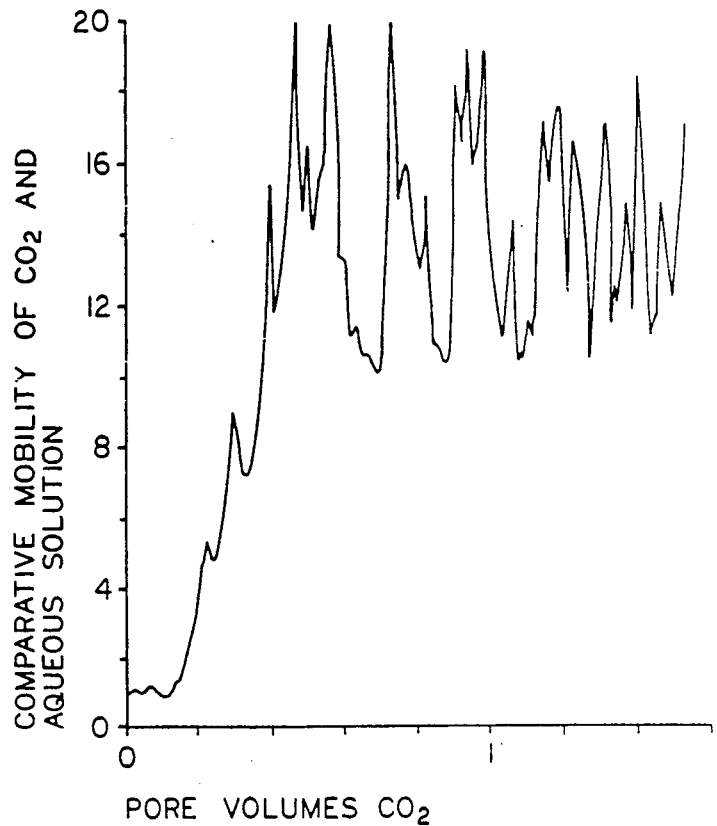
FIG. 1, which illustrates the result of an experimental core displacement test, plots comparative mobility of $CO_2$ and brine without surfactant as a function of pore volumes of $CO_2$ injected.

A mobility control system comprising a mixture of gas and an aqueous solution containing a surfactant for use as a mobility control fluid in recovering oil from a subterranean oil-bearing formation should ideally have the following characteristics:

The mixture should provide resistance to flow of the gas in gas-swept zones where the oil saturation is low.

The mixture should not impair the mobility of gas and oil in unswept zones where oil saturation is high.

The surfactant retention should be low and the surfactant should be effective at low concentrations.

The present invention is premised on the discovery that a mobility control system exhibiting the beneficial characteristics listed above can be formed by use of a surfactant characterized by the formula

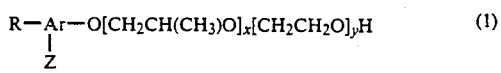

where
R is a linear or branched chain alkyl group with n carbon atoms wherein n ranges from about 6 to about 50, except that if the gas is steam n ranges from about 9 to about 50;
Ar is a mononuclear or fused ring dinuclear aryl group;
Z is an ionic group consisting of $-SO_3^-M^+$ or $-R'-SO_3^-M^+$ wherein $M^+$ is a cation and R is a linear or branched chain alkyl group of from one to about six carbon atoms;
x ranges from 0 to about 20; and
y ranges from 3 to about 100.

The ethoxy and propoxy groups may be present as a block co-polymer chain or they may be intermixed within the alkoxy chain.

M can include alkali metals such as sodium, potassium and lithium, alkaline earth metals such as calcium and barium, amines including alkanol amines and their oxyalkylated adducts, and ammonium.

It should be understood the polyalkoxy surfactants used in the present invention will not normally be pure substances in the strict sense, but a mixture of components such that x and y are the resulting average values.

It should also be understood that in the preparation of the surfactants used in the present invention, the surfactant formulation may contain compounds falling outside formula (1). For example, the formulation may include small amounts of compounds containing more than one alkyl group or more than one sulfonate group attached to the benzene ring.

Non-limiting examples of surfactants characterized by formula (1) suitable for reducing the mobility of carbon dioxide, hydrocarbon gas and inert gas are listed in Table 1:

TABLE 1

| Ar | R | Z | x | y | $M^+$ |
|---|---|---|---|---|---|
| phenyl | linear $C_{16}H_{33}$ | $-SO_3^-M^+$ | 0 | 20 | $Na^+$ |
| phenyl | branched $C_{15}H_{31}$ | $-SO_3^-M^+$ | 0 | 20 | $Na^+$ |
| phenyl | linear $C_{16}H_{33}$ | $-SO_3^-M^+$ | 5 | 20 | $Na^+$ |
| phenyl | linear $C_{16}H_{33}$ | $-SO_3^-M^+$ | 0 | 20 | $NH_4^+$ |
| naphthyl | linear $C_{16}H_{33}$ | $-SO_3^-M^+$ | 0 | 20 | $Na^+$ |
| phenyl | linear $C_{16}H_{33}$ | $-CH_2CH_2CH_2SO_3^-M^+$ | 0 | 20 | $Na^+$ |

Non-limiting examples of surfactants characterized by formula (1) suitable for reducing mobility of steam are listed in Table 2.

TABLE 2

| Ar | R | Z | x | y | $M^+$ |
|---|---|---|---|---|---|
| phenyl | linear $C_{30}H_{61}$ | $-SO_3^-M^+$ | 0 | 20 | $Na^+$ |
| phenyl | branched $C_{30}H_{61}$ | $-SO_3^-M^+$ | 0 | 20 | $Na^+$ |
| phenyl | linear $C_{30}H_{61}$ | $-SO_3^-M^+$ | 5 | 20 | $Na^+$ |
| phenyl | linear $C_{30}H_{61}$ | $-SO_3^-M^+$ | 0 | 20 | $NH_4^+$ |
| naphthyl | linear $C_{30}H_{61}$ | $-SO_3^-M^+$ | 0 | 20 | $Na^+$ |
| phenyl | linear $C_{30}H_{61}$ | $-CH_2CH_2CH_2SO_3^-M^+$ | 0 | 20 | $Na^+$ |

In selecting mobility control surfactants of this invention for a particular flooding operation, the effects of gas composition should be considered. A mobility control system comprising a surfactant represented by formula (1) above and steam will generally have higher mobility than a mobility control system comprising the same surfactant and other gases such as $CO_2$ and $N_2$. Since the mobility of gas in this invention tends to decrease as the number of carbon atoms of the lipophile portion of the surfactant increases, the number of carbon atoms of R in formula (1) is generally higher for use in steam floods than the number of carbon atoms of R for use in other gas floods.

Particularly preferred mobility control systems of this invention include surfactants having a composition characterized by the formula:

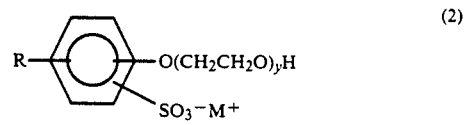

where:
R is a $C_6$ to $C_{30}$ linear or branched alkyl chain for use in $CO_2$, inert gas and hydrocarbon gas floods, and R is a linear or branched $C_{16}$ to $C_{30}$ alkyl chain for use in steam floods; y is 6 to 50; and M is an alkali metal ion.

As understood by those skilled in the art, the optimum surfactant for a particular gas flooding process will depend on the reservoir in which it is used. The optimum values of n, x, and y in formula (1) for a particular gas flooding operation will depend on the reservoir conditions of temperature, pressure, permeability, salinity, oil composition, and the like. The optimum surfactant may be determined by performing core displacement tests using procedures known to those skilled in the art. Such tests may be used to select a surfactant that has low retention, can be used at low concentration, provides a substantial but not excessive reduction of gas mobility, and does not impair the recovery of the oil.

The surfactants of the present invention may be prepared by known procedures. Examples of such procedures are set forth in U.S. Pat. Nos. 2,184,935; 3,393,221; 3,981,361; 4,340,492; and 4,507,211.

The present invention is useful where it is desirable to reduce gas mobility in an area of a subterranean, oil-containing formation to facilitate production of oil from or displacement of oil through the pores of the formation. The formation may be any light or heavy oil reservoir having a permeability suitable for an application of a fluid to displace oil away from a well borehole in a well-cleaning operation or to displace oil through the formation to a producing location in an oil recovery operation.

In general, the gaseous fluids can comprise steam, carbon dioxide, inert gases such as air and nitrogen, and hydrocarbons such as methane, ethane, propane, and natural gas. The gaseous fluids may be used in pure form, or as mixtures with each other, or as mixtures with other gases such as hydrogen sulfide.

Gas and aqueous surfactant solution may be injected into the formation in the form of alternating banks. The gas and aqueous surfactant solution will mix in the formation. However, where desirable, the gas and aqueous solution may be injected simultaneously, as a dispersion of the gas in the liquid or as a pair of co-flowing streams of the two fluids within a common conduit. The components are preferably injected at a pressure sufficient to displace the oil without fracturing the reservoir. However, in low permeability reservoirs controlled fractures of limited extent may be required to obtain adequate injectivity.

As will be understood by those skilled in the art, the preferred ratio of surfactant solution to gas injected in either the alternate or simultaneous mode will depend on the formation. This ratio should be chosen to ensure that the gas and surfactant solution mix well and propagate rapidly in the formation so as to minimize the amounts of gas and surfactant required. It may be advantageous to change this ratio during the course of the flood. In particular, it may be desirable in many formations to inject initially at a high surfactant solution to gas ratio, then reduce this ratio gradually as the flood progresses. The high initial ratio ensures rapid surfactant propagation into the formation and prevents gas from outrunning surfactant. Later, after a significant surfactant concentration has been established throughout a large portion of the reservoir, surfactant need only be injected at a rate sufficient to maintain and propagate the low-mobility dispersion. Optionally, the composition and concentration of surfactant in the aqueous solution may be varied from one bank to the next or during simultaneous injection to optimize the process. If desired, a bank of drive fluid may be injected after the $CO_2$ has been injected to displace the $CO_2$ through the formation.

As will also be understood by those skilled in the art, the optimum duration of the injection cycles in the alternate injection mode will depend on the particular formation. If the duration of these cycles is relatively short (less than about 0.01 pore volume per bank), the effect will be similar to that of simultaneous injection.

In the practice of one embodiment of this invention (wherein the duration of alternate cycles of gas injection and surfactant injection is relatively long), $CO_2$ is injected into an oil-bearing subterranean formation through an injection well. The highly mobile gas will tend to flow preferentially through the more permeable rock sections. The $CO_2$ mobilizes the recoverable oil in those sections. Gas injection continues until sufficient gas has been injected to ensure recovery of a substantial portion of the oil in the more permeable zones, or until gas breakthrough occurs at the production well which is spaced apart from the injection well. A bank of brine containing a surfactant characterized by formula (1) above is then injected, followed by a second bank of $CO_2$ The surfactant solution will preferentially enter the more permeable zones and will reduce gas mobility in those areas, thus diverting $CO_2$ to previously unswept zones of the formation. The process may then be repeated.

In another embodiment of this invention, a small amount of surfactant characterized by formula (1) above is added to water during the last stage of a waterflood operation. Surfactant is injected before start-up of a gas injection project to avoid time delays associated with injecting an additional surfactant bank after the usual waterflood operation has been completed.

The process of this invention may be applied to a subterranean, oil-containing formation penetrated by at least one injection well and at least one spaced-apart production well. The injection well is perforated or other fluid flow communication is established between the well and the formation. The production well is completed in fluid communication with a substantial portion of the vertical thickness of the formation. While recovery of the type contemplated by this invention may be carried out with only two wells, this invention is not limited to any particular number of wells. The invention may be practiced using a variety of well patterns as is well known in the art of oil recovery, such as a repeated five-spot pattern in which each injection well is surrounded with four production wells, or in a line-drive arrangement in which a series of aligned injection wells and a series of aligned production wells are utilized.

This process can also be used in "huff and puff" operations through a single well. In the huff and puff procedure, the reduced gas mobility is generated through the same well that is subsequently used for production. The reduced gas mobility improves the injection profile. The gas mobility in swept zones is greatly reduced so the gas will invade the previously unswept tighter zones. The well may be shut in for a period of time before placing it on the production cycle. After the production cycle, additional cycles of injection and production can be utilized.

The aqueous surfactant solution used in this invention may be prepared from brine or carbonated water. Preferably the water available at the injection well site, often formation brine, will be used to prepare the aqueous surfactant solution.

The concentration of surfactant in the aqueous solution will ordinarily range from about 0.01 to 2% by weight and preferably from about 0.05 to 1%, and still more preferably from 0.05 to 0.5%.

As known to those skilled in the art, the total volumes of aqueous solution and gas required in the practice of this invention will be different for different reservoirs, but they can be estimated by known procedures with reasonable accuracy. Generally, the total pore volume of surfactant solution used in this invention will range from 0.01 to 1 and preferably from 0.1 to 0.5 pore volume.

$CO_2$ used in this invention can be obtained from any available source. It is not necessary that it be pure. The $CO_2$ that is produced through the production wells can be separated therefrom and reinjected into the formation. Recycling methods for $CO_2$ are generally known and do not need further explanation.

Steam used in the present invention can be generated as a dry, superheated, or wet steam and subsequently mixed with aqueous liquid. The steam can be generated at surface or downhole locations and mixed with the aqueous surfactant solution at surface or downhole locations. Optionally, the steam may include a gas that is noncondensable at reservoir temperature and pressure.

EXPERIMENTAL RESULTS

This invention is further illustrated by the following laboratory experiments, which demonstrate the operability of the invention. The experiments are not intended as limiting the scope of the invention as defined in the appended claims.

The core flooding laboratory experiments described below used in.$\times$1 in.$\times$12 in. (2.54 cm$\times$2.54 cm$\times$30.5 cm) San Andres dolomite outcrop cores. Differential pressures were monitored between inlet and outlet and between three pairs of taps 1 in. (2.54 cm) apart located 2 in. (5.04 cm), 6 in. (15.24 cm) and 10 in. (25.40 cm) from the inlet. All experiments were carried out at 2000 psi (13,789 kPa) with decane as the oil phase. A high-salinity brine containing 3.5% by weight total dissolved solids (TDS) was used. The brine had a high content of divalent ions, with a weight-ratio of $CaCl_2$ to NaCl of 1 to 4. The temperature was 100° F. (37.8° C.). Two corefloods are discussed below in detail. The cores were flooded with oil (decane) to connate water saturation and then waterflooded with brine at a rate of 3 ft/day (0.91 m/day) prior to carrying out the experiments. The injection rate of $CO_2$ through the cores was 1 ft/day (0.30 m/day) and the injection rate of surfactant solution was 3 ft/day (0.91 m/day). At this rate, no oil was produced when only surfactant solution flowed through the cores.

Table 3 below sets forth core permeability and injection sequence for each run.

TABLE 3

| Run | Core Permeability | Injection Sequence |
| --- | --- | --- |
| 1 | 110 md | $CO_2$ Flood |
| 2 | 140 md | 0.5% Surfactant, then $CO_2$ |

The surfactant in run 2 was a branched $C_{18}$ alkyl phenol ethoxyol sulfonate, containing 20 ethylene oxide groups ($C_{18}PE_{20}S$), a surfactant represented by formula (1) above, where x=0, y=20, and n=18, and Z is $SO_3^-Na^+$.

The objectives of the tests were to reduce $CO_2$ mobility In a core containing waterflood residual oil and displace the residual oil with the $CO_2$. In the core flood in which surfactant was injected, $CO_2$ mobility was reduced by an unsteady-state process involving a two step injection sequence: injection of surfactant solution followed by injection of $CO_2$. In run 2, sufficient surfactant solution was injected so that the effluent surfactant concentration nearly reached the influent surfactant concentration prior to injection of $CO_2$.

The comparative mobility, oil recovery and surfactant retention of each run are summarized in Table 4 below. The comparative mobility is defined as the ratio of the mobility of the gas-aqueous surfactant solution mixture to water mobility at residual oil saturation. After 0.5 pore volumes (PV) of $CO_2$ injection, the mobility of the aqueous phase is extremely low, so that for good approximation the comparative mobility is simply the mobility of $CO_2$. A comparative mobility greater than unity indicates the gas will be more mobile than water at residual oil saturation. Generally, for effective mobility control in $CO_2$ floods, the comparative mobility should be below about 1, depending on field conditions. A comparative mobility above about 1 would not be desirable due to instability at the displacement front resulting in fingering, bypassing and low displacement efficiency. However, any reduction of mobility brought about by the injection of surfactant solution of this invention will be beneficial, even if the comparative mobility somewhat exceeds 1.

TABLE 4

| RUN | OIL SATURATION BEFORE SURFACTANT INJECTION PV | SURFACTANT RETENTION mg/g rock | OIL RECOVERY at 1.2 PV $CO_2$ INJECTION % $S_{or}$ | COMPARATIVE MOBILITY AFTER 0.5 PV $CO_2$ INJECTION |
| --- | --- | --- | --- | --- |
| 1 | 0.42 | — | 85 | 14 |
| 2 | 0.44 | 0.38 | 81 | 0.2 |

Run 1 provided a base case for the other run. As shown in FIG. 1, the comparative mobility of $CO_2$ characteristically increased to over 10 after $CO_2$ breakthrough. The high mobility is related to the low viscosity of $CO_2$, about 0.06 cp at 2000 psi (13,789 kPa) and 100° F. (37.8° C.). The oil recovery was about 85% of waterflood residual oil saturation ($S_{or}$) after 1.2 pore volumes of $CO_2$ were injected.

Mobility Control Process in Waterflooded Core—Run 2

Figure 2:
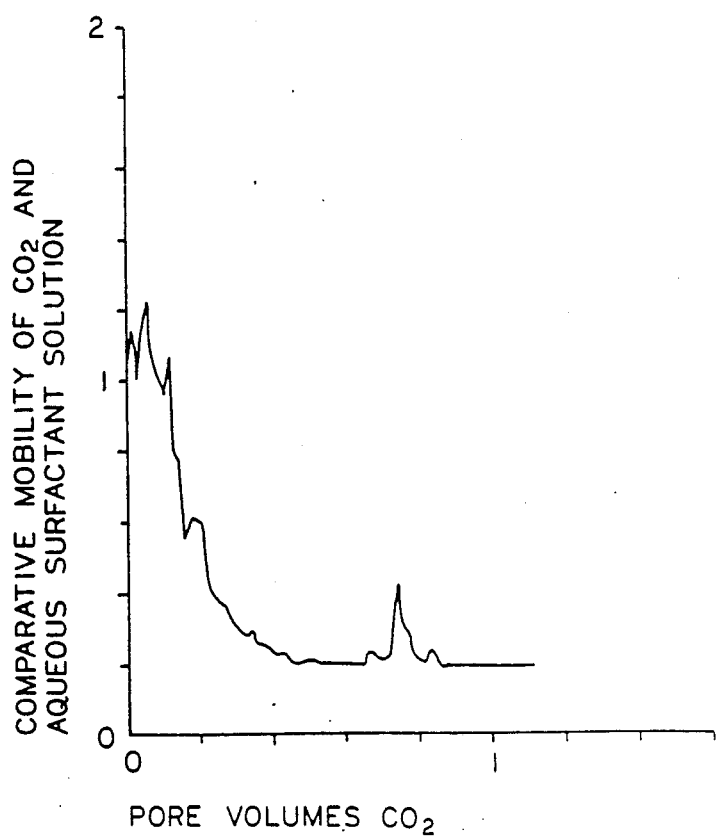
FIG. 2, plots comparative mobility of a mixture of $CO_2$ and aqueous surfactant solution generated in accordance with this invention as a function of pore volumes of $CO_2$ injected.

An aqueous solution containing 3.5% total dissolved solids and 0.5% $C_{18}PE_{20}S$ was injected into a waterflooded core. No additional oil was removed from the core during injection of over 3 pore volumes of the surfactant solution. This demonstrates that at the conditions of the experiment, this surfactant does not reduce oil-water interfacial tension sufficiently to displace waterflood residual oil. During the subsequent $CO_2$ injection, $CO_2$ mobility was much lower than in Run 1. As shown in FIG. 2, the comparative mobility dropped during the first 0.5PV of $CO_2$ injection and then levelled off at about 0.2.

The oil recovery at 1.2 pore volumes of $CO_2$ injected was 81% of waterflood residual oil ($S_{or}$), similar to that obtained in Run 1.

These results demonstrate that the surfactants of this invention are capable of significantly reducing gas mobility without impairing the recovery of residual oil under conditions where retention of the surfactant is low.

The principle of the invention and the best mode contemplated for applying that principle have been described. It will be apparent to those skilled in the art that various changes may be made to the embodiments described above without departing from the spirit and scope of this invention as defined in the following claims. It is, therefore, to be understood that this invention is not limited to the specific details shown and described.

What is claimed is:

1. A method for recovering oil from a subterranean oil-containing formation comprising injecting into the formation through an injection well in communication therewith a gas as the primary oil displacing fluid selected from the group consisting of carbon dioxide, hydrocarbon gas, inert gas, inert gas, and steam, and injecting into the formation an aqueous solution containing a surfactant characterized by the formula

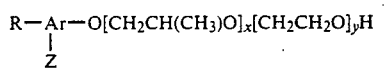

where
R is a linear or branched chain alkyl group with n carbon atoms wherein n ranges from about 6 to about 50, except that if the gas is stream n ranges from about 9 to about 50;
Ar is a mononuclear or fused ring dinuclear aryl group;
Z is an ionic group consisting of $-SO_3^-M^+$ or $-R'-SO_3^-M^+$ wherein $M^+$ is a cation and $R'$ is a linear or branched chain alkyl group of from one to about six carbon atoms;
x ranges from 0 to about 20; and
y ranges from 3 to about 100;
whereby said gas and said aqueous solution containing said surfactant form a mixture in the formation which significantly reduces gas mobility in more permeable regions of the formation.

2. The method of claim 1 wherein the inert gas is air or nitrogen and the hydrocarbon gas is methane, ethane, propane, or natural gas, or mixtures thereof.

3. The method of claim 1 wherein the gas is a mixture of carbon dioxide and a gas selected from the group consisting of steam, inert gas and hydrocarbon gas.

4. The method of claim 1 wherein the gas is carbon dioxide, hydrocarbon gas or inert gas and R is a $C_6$ to $C_{30}$ linear or branched alkyl chain, Ar is a phenyl group, Z is $-SO_3^-M^+$, x is 0, y ranges from 6 to 50, and $M^+$ is an alkali metal ion.

5. The method of claim 1 wherein the gas is carbon dioxide, hydrocarbon gas or inert gas and R is a $C_{18}H_{37}$ alkyl chain, Ar is a phenyl group, Z is $-SO_3^-M^+$ x is 0, y is 20, and $M^+$ is $Na^+$.

6. The method of claim 1 wherein the gas is steam.

7. The method of claim 6 wherein R is a linear or branched $C_{16}$ to $C_{30}$ alkyl chain, Ar is a phenyl group, Z is $-SO_3^-M^+$, x is 0, y ranges from 6 to 50, and $M^+$ is an alkali metal ion.

8. The method of claim 1 wherein the gas is a mixture of steam and a gas selected from the group consisting of carbon dioxide, inert gas and hydrocarbon gas.

9. The method of claim 1 further comprising injecting the aqueous solution containing said surfactant into the formation though said well, injecting gas into the formation through said well, and recovering oil from said well.

10. The method of claim 1 wherein the surfactant concentration in the aqueous solution is 0.01 to 2% by weight.

11. The method of claim 1 wherein the subterranean oil-containing formation is penetrated by at least one injection well and at least one spaced-apart production well further comprising injecting the aqueous solution containing said surfactant into the formation through the injection well, injecting the gas into the formation through the injection well, and recovering oil from the production well.

12. The method of claim 1 wherein said steps of injecting said gas and injecting said aqueous solution containing said surfactant are performed sequentially.

13. The method of claim 1 wherein said steps of injecting said gas and injecting said aqueous solution containing said surfactant are performed simultaneously.

14. A process for recovering oil from a porous, oil-containing subterranean formation penetrated by an injection well and a spaced apart production well, which comprises injecting through said injection well and into said formation an aqueous solution containing a surfactant characterized by the formula

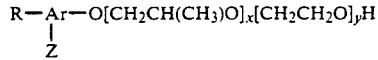

where
R is a linear or branched chain alkyl group with n carbon atoms wherein n ranges from about 6 to about 50, except that if the gas is stream n ranges from about 9 to about 50;
Ar is a mononuclear or fused ring dinuclear aryl group;
Z is an ionic group consisting of $-SO_3^-M^+$ or $-R'-SO_3^-M^+$ wherein $M^+$ is a cation and $R'$ is a linear or branched chain alkyl group of from one to about six carbon atoms;
x ranges from 0 to about 20; and
y ranges from 3 to about 100;
injecting $CO_2$ as the primary oil displacing fluid through said injection well into said formation to drive the oil from said formation to said production well whereby said $CO_2$ and said aqueous solution containing said surfactant form a mixture in the formation which significantly reduces $CO_2$ mobility in more permeable regions of the formation; and producing oil from the production well.

15. The process of claim 14 wherein R is $C_6$ to $C_{30}$ linear or branched alkyl chain, Ar is a phenyl group, Z is $SO_3^-M^+$, x is 0, y ranges from 6 to 50, and $M^+$ is an alkali metal.

16. The process of claim 14 wherein R is $C_{18}H_{37}$ branched alkyl chain, Ar is a phenyl group, Z is $-SO_3^-M^+$, x is 0, y is 20, and $M^+$ is $Na^+$.

17. A process for recovering oil from a porous, oil-containing subterranean formation penetrated by an injection well and a spaced apart production well, which comprises injecting through said injection well and into said formation an aqueous solution containing a surfactant characterized by the formula

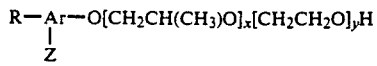

where
- R is a linear or branched chain alkyl group with n carbon atoms wherein n ranges from about 6 to about 50, except that if the gas is stream n ranges from about 9 to about 50;
- Ar is a mononuclear or fused ring dinuclear aryl group;
- Z is an ionic group consisting of $-SO_3{}^-M^+$ or $-R'-SO_3{}^-M^+$ wherein $M^+$ is a cation and $R'$ is a linear or branched chain alkyl group of from one to about six carbon atoms;
- x ranges from 0 to about 20; and
- y ranges from 3 to about 100;

injecting steam through said injection well and into said formation to drive the oil from said formation to said production well whereby said stream and said aqueous solution containing said surfactant form a mixture in the formation which significantly reduces steam mobility in more permeable regions of the formation; and producing oil from the production well.

18. The process of claim 17 wherein R is a linear or branched $C_{16}$ to $C_{30}$ alkyl chain, Ar is a phenyl group, Z is $-SO_3{}^-M^+$ and $M^+$ is an alkali metal ion.

19. A method for reducing gas mobility in a subterranean oil-containing formation having regions of varying permeability comprising injecting into the formation through an injection well in communication therewith a gas as the primary oil displacing fluid wherein said gas is selected from the group consisting of carbon dioxide, hydrocarbon gas, inert gas, and steam, and injecting an aqueous solution containing a surfactant characterized by the formula

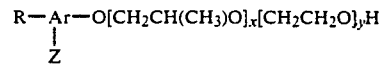

where
- R is a linear or branched alkyl group with n carbon atoms wherein n ranges from about 6 to about 50, except that if the gas is steam n ranges from about 9 to about 50;
- Ar is a mononuclear or fused ring dinuclear aryl group;
- Z is an ionic group consisting of $-SO_3Hu\ -M^+$ or $-R'SO_3{}^-M^+$ wherein $M^+$ is a cation and $R'$ is a linear or branched chain alkyl group of from one to about six carbon atoms;
- x ranges from 0 to about 20; and
- y ranges from 3 to about 100;

whereby said gas and said aqueous solution containing said surfactant form a mixture in the formation which significantly reduces gas mobility in the more permeable regions of said formation.

20. A gas flooding operation for recovering hydrocarbons from a subterranean formation comprising injecting through an injection well a drive fluid of a gas as the primary oil displacing fluid to drive the hydrocarbon from the formation to a producing well and injecting into the formation a mobility control fluid consisting essentially of an aqueous surfactant solution in which the surfactant is represented by the general structural formula:

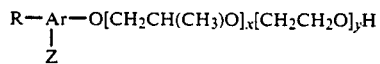

where
- R is a linear or branched chain alkyl group with n carbon atoms wherein n ranges from about 6 to about 50, except that if the gas is steam n ranges from about 9 to about 50;
- Ar is a mononuclear or fused ring dinuclear aryl group;
- Z is an ionic group consisting of $-SO_3{}^-M^+$ or $-R'-SO_3{}^-M^+$ wherein $M^+$ is a cation and $R'$ is a linear or branched chain alkyl group of from one to about six carbon atoms;
- x ranges from 0 to about 20; and
- y ranges from 3 to about 100.

* * * * *

UNITED STATES PATENT AND TRADEMARK OFFICE
CERTIFICATE OF CORRECTION

PATENT NO. : 5,046,560
DATED : September 10, 1991
INVENTOR(S) : Gary F. Teletzke and Ronald L. Reed It is certified that error appears in the above-identified patent and that said Letters Patent is hereby corrected as shown below:

Column 2, Line 25:

$$R - \underset{\underset{Z}{|}}{Ar} - O[CH(CH_3)CH_2O]_x[CH_2CH_2O]_yH$$

Signed and Sealed this

Twenty-first Day of September, 1993

Attest:

BRUCE LEHMAN

Attesting Officer    Commissioner of Patents and Trademarks